United States Patent
Kalgaonkar et al.

(10) Patent No.: US 11,230,661 B2
(45) Date of Patent: Jan. 25, 2022

(54) PROPPING OPEN HYDRAULIC FRACTURES

(71) Applicant: Saudi Arabian Oil Company, Dhahran (SA)

(72) Inventors: Rajendra Arunkumar Kalgaonkar, Abaqaiq (SA); Noor O Baqader, Khobar (SA); Ahmed M. Gomaa, Khobar (SA); Khalid R. Alnoaimi, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/013,255

(22) Filed: Sep. 4, 2020

(65) Prior Publication Data

US 2021/0071067 A1    Mar. 11, 2021

Related U.S. Application Data

(60) Provisional application No. 62/896,255, filed on Sep. 5, 2019.

(51) Int. Cl.
*C09K 8/80* (2006.01)
*C09K 8/92* (2006.01)
*E21B 43/267* (2006.01)
*B82Y 30/00* (2011.01)

(52) U.S. Cl.
CPC .............. *C09K 8/80* (2013.01); *C09K 8/92* (2013.01); *E21B 43/267* (2013.01); *B82Y 30/00* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 2,630,410 | A | 3/1953 | Clapsadle et al. |
| 3,500,926 | A | 3/1970 | Richardson |
| 3,601,197 | A | 8/1971 | Ayers et al. |
| 3,668,123 | A | 6/1972 | Steinberg |
| 3,708,428 | A | 1/1973 | McDonald |
| 3,713,489 | A | 1/1973 | Fast et al. |
| 3,764,530 | A | 10/1973 | Burland |
| 3,880,764 | A | 4/1975 | Donham |
| 3,937,283 | A | 2/1976 | Blauer et al. |
| 3,951,824 | A | 4/1976 | Maxson et al. |
| 3,980,136 | A | 9/1976 | Plummer et al. |

(Continued)

FOREIGN PATENT DOCUMENTS

| CA | 2843319 | 2/2013 |
|---|---|---|
| CN | 104449631 | 3/2015 |

(Continued)

OTHER PUBLICATIONS

Abdo et al., "Nano-Enhanced Drilling Fluids: Pioneering Approach to Overcome Uncompromising Drilling Problems," ASME, Journal of Energy Resources Technology 134:1, 014501-1, Mar. 2012, 6 pages.

(Continued)

*Primary Examiner* — Andrew Sue-Ako
(74) *Attorney, Agent, or Firm* — Fish & Richardson P.C.

(57) ABSTRACT

A composition includes an emulsion of nanocomposite in water and a proppant. The nanocomposite includes an epoxy resin and an organically modified montmorillonite compatible to the epoxy resin.

5 Claims, 4 Drawing Sheets

(56) References Cited

U.S. PATENT DOCUMENTS

| | | |
|---|---|---|
| 4,044,833 A | 8/1977 | Volz |
| 4,072,194 A | 2/1978 | Cole et al. |
| 4,209,409 A | 6/1980 | Forster et al. |
| 4,216,829 A | 8/1980 | Murphy |
| 4,218,316 A | 8/1980 | Watson |
| 4,231,882 A | 11/1980 | Elphingstone et al. |
| 4,425,244 A | 1/1984 | House |
| 4,460,627 A | 7/1984 | Waver |
| 4,532,052 A | 7/1985 | Waver |
| 4,624,870 A | 11/1986 | Anthony |
| 4,680,128 A | 7/1987 | Portnoy |
| 4,711,731 A | 12/1987 | Garvey |
| 4,732,213 A | 3/1988 | Bennett et al. |
| 4,745,139 A | 5/1988 | Haasl et al. |
| 4,836,284 A | 6/1989 | Tinker |
| 4,846,277 A | 7/1989 | Khalil et al. |
| 4,927,749 A | 5/1990 | Dorn |
| 5,069,283 A | 12/1991 | Mack |
| 5,125,456 A | 6/1992 | Hutchins et al. |
| 5,141,920 A | 8/1992 | Bland et al. |
| 5,178,217 A | 1/1993 | Mohammadi et al. |
| 5,320,171 A | 6/1994 | Laramay |
| 5,360,787 A | 11/1994 | Bloys |
| 5,368,833 A | 11/1994 | Johansson et al. |
| 5,424,283 A | 6/1995 | Miano |
| 5,529,123 A | 6/1996 | Carpenter et al. |
| 5,582,249 A | 12/1996 | Caverny et al. |
| 5,613,555 A | 3/1997 | Sorem et al. |
| 5,616,541 A | 4/1997 | Dobson, Jr. et al. |
| 5,646,092 A | 7/1997 | Carminati |
| 5,667,697 A | 9/1997 | Salmen |
| 5,836,390 A | 11/1998 | Apps et al. |
| 5,875,845 A | 3/1999 | Chatterji et al. |
| 5,912,219 A | 6/1999 | Carrie et al. |
| 5,957,203 A | 9/1999 | Hutchins et al. |
| 6,085,839 A | 7/2000 | Wyant et al. |
| 6,121,336 A | 9/2000 | Okoroafor et al. |
| 6,207,620 B1 | 3/2001 | Gonzalez et al. |
| 6,478,971 B1 | 11/2002 | Koefod et al. |
| 6,663,778 B1 | 12/2003 | Bader |
| 6,729,409 B1 | 5/2004 | Gupta et al. |
| 6,802,375 B2 | 10/2004 | Bosma et al. |
| 7,001,872 B2 | 2/2006 | Pyecroft et al. |
| 7,013,973 B2 | 3/2006 | Danican et al. |
| 7,063,150 B2 | 6/2006 | Slabaugh et al. |
| 7,093,663 B1 | 8/2006 | Bader |
| 7,134,497 B1 | 11/2006 | Chatterji et al. |
| 7,198,722 B2 | 4/2007 | Hussain |
| 7,252,146 B2 | 8/2007 | Slabaugh et al. |
| 7,273,101 B2 | 9/2007 | Davies et al. |
| 7,278,485 B2 | 10/2007 | Kirsner et al. |
| 7,281,581 B2 | 10/2007 | Nguyen et al. |
| 7,426,961 B2 | 9/2008 | Stephenson et al. |
| 7,458,424 B2 | 12/2008 | Odeh et al. |
| 7,491,681 B2 | 2/2009 | Dobson, Jr. et al. |
| 7,507,697 B1 | 3/2009 | Shertok et al. |
| 7,559,369 B2 | 7/2009 | Roddy et al. |
| 7,581,590 B2 | 9/2009 | Lesko |
| 7,610,962 B2 | 11/2009 | Fowler |
| 7,622,430 B2 | 11/2009 | Davies et al. |
| 7,645,723 B2 | 1/2010 | Kirsner et al. |
| 7,712,528 B2 | 5/2010 | Langdon |
| 7,721,803 B2 | 5/2010 | Huang et al. |
| 7,767,628 B2 | 8/2010 | Kippie et al. |
| 7,819,192 B2 | 10/2010 | Weaver et al. |
| 7,845,409 B2 | 12/2010 | Shinbach et al. |
| 7,854,277 B2 | 12/2010 | Duncum et al. |
| 7,867,613 B2 | 1/2011 | Smith et al. |
| 7,886,826 B2 | 2/2011 | Robinson et al. |
| 7,934,557 B2 | 5/2011 | Nguyen |
| 7,954,549 B2 | 6/2011 | Lende et al. |
| 8,012,358 B2 | 9/2011 | Salbaugh et al. |
| 8,100,190 B2 | 1/2012 | Weaver |
| 8,132,623 B2 | 3/2012 | Allin et al. |
| 8,235,116 B1 | 8/2012 | Burts et al. |
| 8,557,916 B1 | 10/2013 | Alsharaeh et al. |
| 8,584,755 B2 | 11/2013 | Willberg et al. |
| 8,603,952 B2 | 12/2013 | Roddy et al. |
| 8,685,903 B2 | 4/2014 | Ravi et al. |
| 8,691,737 B2 | 4/2014 | Chatteiji et al. |
| 8,763,699 B2 | 7/2014 | Medvedev et al. |
| 8,815,096 B2 | 8/2014 | Zuback et al. |
| 8,834,726 B2 | 9/2014 | Keister |
| 8,852,682 B2 | 10/2014 | Sinclair et al. |
| 8,985,213 B2 | 3/2015 | Saini et al. |
| 9,045,965 B2 | 6/2015 | Patil et al. |
| 9,080,440 B2 | 7/2015 | Panga |
| 9,085,477 B2 | 7/2015 | Banerjee et al. |
| 9,133,386 B2 | 9/2015 | Kumar et al. |
| 9,181,789 B2 | 11/2015 | Nevison |
| 9,266,754 B2 | 2/2016 | Fazrie et al. |
| 9,321,956 B2 | 4/2016 | Nguyen et al. |
| 9,447,673 B2 | 9/2016 | Medvedev et al. |
| 9,453,156 B2 | 9/2016 | Wu |
| 9,550,933 B2 | 1/2017 | Chatteiji et al. |
| 9,725,639 B2 | 8/2017 | Vo et al. |
| 9,784,079 B2 | 10/2017 | Salla et al. |
| 9,863,231 B2 | 1/2018 | Hull |
| 10,053,613 B1 | 8/2018 | Kalgaonkar et al. |
| 10,100,245 B1 | 10/2018 | Bulekbay et al. |
| 10,208,239 B2 | 2/2019 | Ballard |
| 10,280,122 B2 | 5/2019 | Salla et al. |
| 10,287,480 B1 | 5/2019 | Reddy |
| 10,344,200 B2 | 7/2019 | Salla et al. |
| 10,407,609 B2 | 9/2019 | Kargaonkar et al. |
| 10,450,495 B2 | 10/2019 | Reddy |
| 10,526,524 B2 | 1/2020 | Reddy |
| 10,655,443 B2 | 5/2020 | Gomma et al. |
| 2004/0003905 A1 | 2/2004 | Shinbach et al. |
| 2004/0040708 A1 | 3/2004 | Stephenson |
| 2004/0154799 A1 | 8/2004 | Powell |
| 2004/0157749 A1 | 8/2004 | Ely et al. |
| 2004/0173244 A1 | 9/2004 | Strothoff et al. |
| 2005/0098315 A1 | 5/2005 | Danican |
| 2005/0137094 A1 | 6/2005 | Weaver et al. |
| 2005/0194147 A1 | 9/2005 | Metcalf et al. |
| 2005/0274516 A1 | 12/2005 | Nelson et al. |
| 2005/0274517 A1 | 12/2005 | Blanch |
| 2005/0274523 A1 | 12/2005 | Brannon |
| 2005/0277554 A1 | 12/2005 | Blanch |
| 2006/0035808 A1 | 2/2006 | Ahmed et al. |
| 2006/0041028 A1 | 2/2006 | Crews |
| 2006/0073980 A1 | 4/2006 | Brannon et al. |
| 2007/0012437 A1 | 1/2007 | Clingman et al. |
| 2007/0042912 A1 | 2/2007 | Welton |
| 2007/0079965 A1 | 4/2007 | Nguyen |
| 2008/0035343 A1 | 2/2008 | Odeh et al. |
| 2008/0135242 A1 | 6/2008 | Lesko |
| 2008/0149329 A1 | 6/2008 | Cooper |
| 2008/0153718 A1 | 6/2008 | Heidenfelder et al. |
| 2008/0241262 A1 | 10/2008 | Lee et al. |
| 2009/0044945 A1 | 2/2009 | Willberg et al. |
| 2009/0124522 A1 | 5/2009 | Roddy |
| 2009/0151944 A1 | 6/2009 | Fuller et al. |
| 2009/0221453 A1 | 9/2009 | Mukhopadhyay et al. |
| 2009/0298720 A1 | 12/2009 | Nguyen et al. |
| 2009/0312201 A1 | 12/2009 | Huang et al. |
| 2010/0043823 A1 | 2/2010 | Lee |
| 2010/0055458 A1 | 3/2010 | Jang et al. |
| 2010/0096139 A1 | 4/2010 | Holcomb |
| 2010/0252259 A1 | 10/2010 | Horton |
| 2010/0282468 A1 | 11/2010 | Willberg et al. |
| 2010/0323933 A1 | 12/2010 | Fuller |
| 2011/0053808 A1 | 3/2011 | Miller |
| 2011/0094746 A1 | 4/2011 | Allison et al. |
| 2011/0131873 A1 | 6/2011 | Soane |
| 2011/0257051 A1 | 10/2011 | Welton |
| 2012/0015852 A1 | 1/2012 | Quintero |
| 2012/0018143 A1 | 1/2012 | Lembcke |
| 2012/0125618 A1 | 5/2012 | Willberg |
| 2012/0205313 A1 | 8/2012 | Sathrugnan et al. |
| 2012/0207795 A1 | 8/2012 | Zink et al. |
| 2012/0211227 A1 | 8/2012 | Thaemlitz et al. |
| 2012/0247764 A1 | 10/2012 | Panga |

(56) References Cited

U.S. PATENT DOCUMENTS

| | | |
|---|---|---|
| 2012/0305247 A1 | 12/2012 | Chen |
| 2013/0048562 A1 | 2/2013 | Keister |
| 2013/0233623 A1 | 9/2013 | Aston |
| 2013/0260649 A1 | 10/2013 | Thomson |
| 2013/0274149 A1* | 10/2013 | Lafitte ................ C09K 8/035 507/112 |
| 2013/0292120 A1 | 11/2013 | Patil et al. |
| 2014/0000899 A1 | 1/2014 | Nevison |
| 2014/0131040 A9 | 5/2014 | Panga |
| 2014/0144633 A1 | 5/2014 | Nguyen |
| 2014/0144634 A1 | 5/2014 | Nguyen |
| 2014/0144635 A1 | 5/2014 | Nguyen |
| 2014/0158354 A1 | 6/2014 | Kumar et al. |
| 2014/0158632 A1 | 6/2014 | Govind et al. |
| 2014/0290943 A1 | 10/2014 | Ladva |
| 2014/0296113 A1 | 10/2014 | Reyes |
| 2014/0352954 A1 | 12/2014 | Lakhtychkin et al. |
| 2015/0068747 A1 | 3/2015 | Hwang |
| 2015/0083420 A1 | 3/2015 | Gupta et al. |
| 2015/0083669 A1 | 3/2015 | Matherly et al. |
| 2015/0101808 A1 | 4/2015 | Saini |
| 2015/0197998 A1 | 7/2015 | Kapila et al. |
| 2015/0211346 A1 | 7/2015 | Potapenko |
| 2015/0299558 A1 | 10/2015 | Sui et al. |
| 2015/0322328 A1 | 11/2015 | Boul |
| 2015/0344765 A1 | 12/2015 | Kumar et al. |
| 2015/0369028 A1 | 12/2015 | Potapenko |
| 2016/0032169 A1 | 2/2016 | Chew |
| 2016/0090525 A1 | 3/2016 | McDonald et al. |
| 2016/0137904 A1 | 5/2016 | Drake et al. |
| 2016/0137905 A1 | 5/2016 | Patil |
| 2016/0139588 A1 | 5/2016 | Huang |
| 2016/0145486 A1* | 5/2016 | Weaver ................ C09K 8/72 507/219 |
| 2016/0153274 A1 | 6/2016 | Hull et al. |
| 2016/0154133 A1 | 6/2016 | Donderici et al. |
| 2016/0177162 A1 | 6/2016 | Nguyen |
| 2016/0201433 A1 | 7/2016 | Kalgaonkar |
| 2016/0201443 A1 | 7/2016 | Nguyen |
| 2016/0215604 A1 | 7/2016 | Potapenko et al. |
| 2016/0230070 A1 | 8/2016 | Wagle et al. |
| 2016/0304772 A1 | 10/2016 | Al-Harbi |
| 2016/0319189 A1 | 11/2016 | Dusterhoft |
| 2016/0347994 A1 | 12/2016 | Purdy et al. |
| 2017/0058186 A1 | 3/2017 | Oghena |
| 2017/0121593 A1 | 5/2017 | Pantsurkin |
| 2017/0138190 A1 | 5/2017 | Elkatatny et al. |
| 2017/0197853 A1 | 7/2017 | Chudasama et al. |
| 2017/0247598 A1* | 8/2017 | Kennedy ............... E21B 33/138 |
| 2018/0202278 A1 | 7/2018 | Nelson et al. |
| 2018/0244981 A1 | 8/2018 | Panga et al. |
| 2018/0265773 A1 | 9/2018 | Zhang |
| 2018/0334612 A1 | 11/2018 | Bulekbay et al. |
| 2018/0346797 A1 | 12/2018 | Kalgoankar et al. |
| 2019/0264095 A1 | 8/2019 | Qu et al. |
| 2019/0352555 A1 | 11/2019 | Kalgaonkar et al. |
| 2019/0352556 A1 | 11/2019 | Kalgaonkar et al. |

FOREIGN PATENT DOCUMENTS

| | | |
|---|---|---|
| CN | 104530987 | 4/2015 |
| CN | 105801783 | 7/2016 |
| CN | 105924599 | 9/2016 |
| EP | 0260888 | 3/1988 |
| EP | 0306546 | 3/1989 |
| EP | 2167604 | 12/2010 |
| EP | 17175344 | 6/2017 |
| FR | 2920435 | 8/2007 |
| GB | 2063840 | 6/1981 |
| JP | 2014196444 | 10/2014 |
| RU | 2152967 | 7/2000 |
| RU | 2001132070 | 3/2004 |
| RU | 2008116114 | 10/2009 |
| RU | 2010130026 | 1/2012 |
| WO | WO 1998037014 | 8/1998 |
| WO | WO 1999036359 | 7/1999 |
| WO | WO 2003033618 | 4/2003 |
| WO | WO 2004018381 | 3/2004 |
| WO | WO 2004035473 | 4/2004 |
| WO | WO 2004035474 | 4/2004 |
| WO | WO 2004061046 | 7/2004 |
| WO | WO 2006108161 | 10/2006 |
| WO | WO 2016108161 | 10/2006 |
| WO | WO 2007017806 | 2/2007 |
| WO | WO 2008118239 | 10/2008 |
| WO | WO 2009034287 | 3/2009 |
| WO | WO 2010026553 | 3/2010 |
| WO | WO 2010070600 | 6/2010 |
| WO | WO 2012009448 | 1/2012 |
| WO | WO 2012087887 | 6/2012 |
| WO | WO 2013041633 | 3/2013 |
| WO | WO 2014085770 | 6/2014 |
| WO | WO 2014179020 | 11/2014 |
| WO | WO 2014190226 | 11/2014 |
| WO | WO 2015012818 | 1/2015 |
| WO | WO 2015041703 | 3/2015 |
| WO | WO 2015047210 | 4/2015 |
| WO | WO 2015103096 | 7/2015 |
| WO | WO 2015112132 | 7/2015 |
| WO | WO 2015124214 | 8/2015 |
| WO | WO 2016032578 | 3/2016 |
| WO | WO 2016048332 | 3/2016 |
| WO | WO 2017040553 | 3/2017 |
| WO | WO 2017049039 | 3/2017 |
| WO | WO 2019070241 | 4/2019 |
| WO | WO 2019112824 | 6/2019 |

OTHER PUBLICATIONS

Abdou et al., "Evaluation of Egyptian Bentonite and Nano-Bentonite as Drilling Mud," Egyptian Petroleum Research Institute (EPRI), Egyptian Journal of Petroleum 22: 53-59, 2013, 7 pages.

Agarwal et al., "Flow Behavior of Nanoparticle Stabilized Drilling Fluids and Effect of High Temperature Aging," AADE-11-NTCE-3, American Association of Drilling Engineers (AADE), presented at the AADE National Technical Conference and Exhibition, Apr. 12-14, 2011, 6 pages.

AkzoNobel, "Product Data Sheet: Levasil CS30-516 P," available on or before 2020, 1 page.

AkzoNobel, "Product Guide Bindzil and Levasil: Function and Applications," AkzoNovel, 2010, 6 pages.

Al-Muntasheri et al., "Investigation of a High Temperature Organic Water Shutoff Gel: Reaction Mechanisms," SPE 97530, Society of Petroleum Engineers International (SPE), presented at the SPE International Improved Oil Recoveiy Conference, Dec. 5-6, 2005, 9 pages.

Alsharaeh et al., "Evaluation of nanomechanical properties of (styrene-methyl methacrylate) copolymer composites containing graphene sheets," American Chemical Society Publications (ACS), Industrial & Engineering Chemistry Research (I&EC) 52: 17871-17881, Nov. 2013, 11 pages.

Alsharaeh et al., "Microwave Irradiation Effect on the Dispersion and Thermal Stability of RGO Nanosheets within a Polystyrene Matrix," Materials 7:7 (5212-5224), Jul. 2014, 23 pages.

Bai et al., "Case Study on Preformed Particle Gel for In-depth Fluid Diversion," SPE 113997, Society of Petroleum Engineers International (SPE), presented at the SPE/DOE Improved Oil Recovery Symposium, Apr. 19-23, 2008, 18 pages.

Baker Hughes Pressure Pumping, "Clay Master—5c Safety Data Sheet," Chem Alert, May 31, 2011, 5 pages.

Barree et al., "Realistic Assessment of Proppant Pack Conductivity for Material Selection," SPE 84306, Society of Petroleum Engineers (SPE), presented at the SPE Annual Technical Conference and Exhibition, Oct. 5-8, 2003, 12 pages.

Beck et al., "The Effect of Rheology on Rate of Penetration," SPE/IADC 29368, Society of Petroleum Engineers International (SPE), IADC, presented at the SPE/IADC Drilling Conference, Feb. 28-Mar. 2, 1995, 9 pages.

(56) References Cited

OTHER PUBLICATIONS

Bern et al., "Barite Sag: Measurement, Modeling, and Management," Society of Petroleum Engineers International (SPE), SPE Drill & Completion 15:1, Mar. 2000, 6 pages.

Bern et al., "The Influence of Drilling Variables on Barite Sag," SPE 36670, Society of Petroleum Engineers International (SPE), presented at the SPE Annual Technical Conference and Exhibition, Oct. 6-9, 1996, 8 pages.

Chen et al., "Polyacrylamide and its derivatives for oil recovery," Dissertation Presented to the Faculty of the Graduate School of Missouri University of Science and Technology in Partial Fulfillment of the Requirements for the Degree of Doctor of Philosophy in Chemistry, Fall 2016, 226 pages.

Cheng et al., "Cotton aerogels and cotton-cellulose aerogels from environmental waste for oil spillage cleanup," Materials & Design 130: 452-453, May 28, 2017, 7 pages.

Chevalier et al., "Emulsions Stabilized with Solid Nanoparticles: Pickering Emulsions," Colloids and Surfaces A: Physicochemical and Engineering Aspects 439: 23-34, Mar. 7, 2013, 12 pages.

Chu et al., "Glycidoxypropyltrimethocysilane Modified Colloidal Silica Coatings," MRS Proceedings, 435, Jan. 1, 1996, 5 pages.

Dalrymple, "Water Control Treatment Design Technology," SPE 29194, Society of Petroleum Engineers International (SPE), proceedings of the 15th World Petroleum Congress, Oct. 12-17, 1997, 3 pages.

Dovan et al., "Delaying Gelation of Aqueous Polymers at Elevated Temperatures Using Novel Organic Crosslinkers," SPE-37246-MS, Society of Petroleum Engineers International (SPE), presented at the SPE International Symposium on Oilfield Chemistry, Feb. 18-21, 1997, 11 pages.

Drdlova et al., "Effect of Nanoparticle Modification on Static and Dynamic Behavior of Foam Based Blast Energy Absorbers," Cellular Polymers 35:3, May 2016, 16 pages.

Dye et al., "Correlation of Ultra-Low Shear Rate Viscosity and Dynamic Barite Sag in Invert-Emulsion Drilling Fluids," SPE 56636, Society of Petroleum Engineers International (SPE), presented at the SPE Annual Technical Conference and Exhibition, Oct. 3-6, 1999, 11 pages.

Esmaeilzadeh et al., "Wettability alteration of carbonate rocks from liquid-wetting to ultra gas-wetting using TiO2, SiO2 and CNT nanofluids containing flurorchemicals, for enhanced gas recovery," Journal of Natural Gas Science and Engineering 26: 1294-1305, Sep. 2015, 12 pages.

Fan et al., "Amphiphilic Silica Nanoparticles at the Decane—Water Interface: Insights from Atomistic Simulations," American Chemical Society Publications (ACS), Langmuir 27:9 (5264-5274), May 3, 2011, 11 pages.

Gilardo et al., "Wettability alteration of sandstone cores by alumina-based nanofluids," American Chemical Society Publications (ACS), Energy and Fuels 27:7 (3659-3665), Jul. 18, 2013, 7 pages.

Gillard et al., "A New Approach to Generating Fracture Conductivity," SPE 135034, Society of Petroleum Engineers (SPE), presented at the 2010 SPE Annual Technical Conference and Exhibition, Sep. 20-22, 2010, 14 pages.

Gomaa et al., "Acid Fracturing: The Effect of Formation Strength on Fracture Conductivity," SPE 119623 presented at the SPE Hydraulic Fracturing Technology Conference, Jan. 2009, 18 pages.

Gomaa et al., "Computational Fluid Dynamics Applied to Investigate Development and Optimization of Highly Conductive Channels within the Fracture Geometry," SPE 179143-MS, Society of Petroleum Engineers (SPE), presented at the SPE Hydraulic Fracturing Technology Conference, Feb. 9-11, 2016, 18 pages.

Gomaa et al., "Improving Fracture Conductivity by Developing and Optimizing Channels within the Fracture Geometry: CFD Study," SPE-178982-MS, Society of Petroleum Engineers International (SPE), presented at SPE International Conference and Exhibition on Formation Damage Control, Feb. 24-26, 2016, 25 pages.

Greenwood and Gevert, "Aqueous silane modified silica sols: theory and preparation," Pigment and Resin Technology 40:5 (275-284), 2011, 10 pages.

Gurav et al., "Silica Aerogel: Synthesis and Applications," Hindawi Publishing Corporation, Journal of Nanomaterials 2010:409310, Jan. 1, 2010, 11 pages.

Huang et al., "Systematic Approach to Develop a Colloidal Silica Based Gel System for Water Shut-Off," SPE-193942-MS, Society of Petroleum Engineers International (SPE), presented at the SPE Middle East Oil & Gas Schow and Conference, Mar. 6-9, 2017, 19 pages.

Hunt et al., "Kinetics of the gelation of colloidal silica at geothermal conditions and implications for reservoir modification and management," SGP-TR-198, proceedings of the Thirty-Eighth Workshop on Geothermal Reservoir Engineering, Feb. 11-13, 2013, 10 pages.

Iler and Dalton, "Degree of Hydration of Particles of Colloidal Silica in Aqueous Solution," Journal of Physical Chemistry 60:7, Jul. 1956, 3 pages.

Iller, "The Chemistry of Silica," John Wiley & Sons, Jun. 1979, 5 pages.

Jiantaol and Bingcheng, "Development of Silica Aerogel and Hollow Glass Microspheres Based Heat-Insulating Coatings," Paint & Coatings Industry, Jul. 1, 2013, 1 pages.

Kaminsky et al., "Viscous Oil Recovery using Solid Stabilized Emulsion," SPE 135284, Society of Petroleum Engineers International (SPE), presented at the SPE Annual Technical Conference and Exhibition, Sep. 19-22, 2010, 11 pages.

Keivani et al., "Synergistic Toughening in Ternary Silica/Hallow Glass Spheres/Epoxy Nanocomposites," Polymer-Plastics Technology and Engineering 54:6 (581-593), 2015, 14 pages.

Kenny et al., "Hole-Cleaning Capabilities of an Ester-Based Drilling Fluid System," SPE Drilling & Completion, Mar. 1996, 7 pages.

Kern et al., "Propping Fractures with Aluminum Particles," SPE-1573-G, Society of Petroleum Engineers (SPE), presented at the 35th Annual Fall Meeting of SPE, Oct. 2-5, 1960, Journal of Petroleum Technology, Jun. 1961, 7 pages.

Khan et al., "Graphene based metal and metal oxide nanocomposites: synthesis, properties and their applications," Royal Society of Chemistry (RSC), Journal of Materials Chemistry A 3:37, Jan. 1, 2015, 57 pages.

Kondiparty et al., "Dynamic Spreading of Nanofluids on Solids. Part 1: Experimental," American Chemical Society Publications (ACS), Langmuir 28: 14618-14623, Sep. 11, 2012, 6 pages.

Kumar et al., "Nanostructured zirconia decorated reduced graphene oxide based efficient biosensing platform for non-invasive oral cancer detection," Biosensors and Bioelectronics 78: 497-504, Apr. 1, 2016, 8 pages.

Li et al., "Fabrication and properties of machinable 3Y-Zr0"2/BN nanocomposites," Materials Science and Engineering: A 397:1-2 (35-40), Apr. 25, 2005, 6 pages.

Ligthelm, "Water Shut-off in Gas Wells: Is there Scope for a Chemical Treatment?" SPE 68978, Society of Petroleum Engineers International (SPE), presented at the SPE European Formation Damage Conference, May 21-22, 2001, 10 pages.

Liu et al., "Microwave-assisted synthesis of TiO2-reduced graphene oxide composites for the photocatalytic reduction of Cr(vi)," Royal Society of Chemistry (RSC), RSC Advances 1:7 (1245-1249), Jan. 1, 2011, 5 pages.

Liu et al., "Photolatently modulable hydrogels using unilamellar titania nanosheets as photocatalytic crosslinkers," Nature Communications 4:1 (2029), Jun. 18, 2013, 7 pages.

Liu et al., "Tough and highly stretchable graphene oxide/polyacrylamide nanocomosite hydrogels," Royal Society of Chemistry (RSC), Journal of Materials Chemistry 22:28 (14160-14167), Jan. 1, 2012, 8 pages.

Magryta, "Effect of Aerogel on the Properties of Acrylonitrile-butadiene rubber (NBR) Vulcanizates," Polimer 57:2, Feb. 1, 2012, 7 pages.

Mahdavi et al., "Polyacrylamide/reduced graphene oxide-Ag nanocomposite as highly efficient antibacterial transparent film," J Iranian Chem Society 14:1 (37-46), Aug. 6, 2016, 10 pages.

Maleki et al., "An overview on silica aerogels synthesis and different mechanical reinforcing strategies," Journal of Non-Crystalline Solids 385: 55-74, Feb. 1, 2014, 20 pages.

(56) References Cited

OTHER PUBLICATIONS

Maxey, "Rheological Analysis of Static and Dynamic Sag in Drilling Fluids," Annual Transactions of the Nordic Rheology Society 15, 2007, 8 pages.
Mayerhofer et al., "Proppants? We Don't Need No Proppants," SPE 38611, Society of Petroleum Engineers International (SPE), presented at the SPE Annual Technical Conference and Exhibition, Oct. 5-8, 1997, 8 pages.
Meyer et al., "Theoretical Foundation and Design Formulae for Channel and Pillar Type Propped Fractures—A Method to Increase Fracture Conductivity," SPE-170781-MS, Society of Petroleum Engineers International (SPE), presented at SPE Annual Technical Conference and Exhibition, Oct. 27-29, 2014, 25 pages.
Michael et al., "Enhanced Polyacrylamide Polymer Gels using Zirconium Hydroxide Nanoparticles from Water Shutoff at High Temperatures: The Thermal and Rheological Investigations," Industrial & Engineering Chemistry Research 57:48, Nov. 6, 2018, 27 pages.
Mohammadi et al., "Studying Rheological Behavior of Nanoclay as Oil Well Drilling Fluid," Res Chem Intermed 41: 2823-2831, 2015, Sep. 21, 2013, 9 pages.
Mordina et al., "Impact of graphene oxide on the magnetorheological behaviour of BaFe12019 nanoparticles filled polyacrylamide hydrogel," Polymer 97: 253-272, May 11, 2016, 15 pages.
Mowrey et al., "Achieving the Drilling Performance Benefits of a Clay-Free System in a Variety of Commonly-Used Base Fluids," AADE-06-DF-HO-07, American Association of Drilling Engineers (AADE), presented at the AADE Fluids Conference, Apr. 11-12, 2006, 5 pages.
Mutua et al., "Surface Modification of Hollow Glass Microspheres," Scientific Research, Materials Sciences and Applications, 3:856-860, Dec. 2012, 5 pages.
Nasr-El-Din and Taylor, "Evaluation of sodium silicate/urea gels used for water shut-off treatments," Journal of Petroleum Science and Engineering 48:3-4 (141-160), Sep. 15, 2005, 20 pages.
Nicora et al., "High-Density Invert-Emulsion System with Very Low Solids Content to Drill ERD and HPHT Wells," SPE 65000, Society of Petroleum Engineers International (SPE), presented at the 2001 SPE International Symposium on Oilfield Chemistiy, Feb. 13-16, 2001, 17 pages.
Ogolo et al., "Enhanced Oil Recovery Using Nanoparticles," SPE 160847, Society of Petroleum Engineers International (SPE), presented at the SPE Saudi Arabia Section Technical Symposium and Exhibition, Apr. 8-11, 2012, 9 pages.
Palisch et al., "Determining Realistic Fracture Conductivity and Understanding Its Impact on Well Performance—Theory and Field Examples," SPE 106301, Society of Petroleum Engineers (SPE), presented at the 2007 SPE Hydraulic Fracturing Technology Conference, Jan. 29-31, 2007, 13 pages.
Pham et al., "Rheological evaluation of a sodium silicate gel system for water management in mature, naturally-fractured oilfields," Journal of Petroleum Science and Engineering 138: 213-233, Dec. 4, 2015, 16 pages.
Pojanavaraphan et al., "Solution Cross-Linked Natural Rubber (NR)/Clay Aerogel Composites," American Chemical Society (ACS), Macromolecules 44:4 (923-931), Feb. 22, 2011, 9 pages.
Rotaru et al., "Performances of clay aerogel polymer composites for oil spill sorption: Experimental design and modeling," Separation and Purification Technology 133: 260-275, Jul. 11, 2014, 16 pages.
Saasen et al., "Monitoring of Barite SAG Important in Deviated Drilling," Oil & Gas Journal, Aug. 26, 1991, 15 pages.
Saasen et al., "Prediction of Barite Sag Potential of Drilling Fluids from Rheological Measurements," SPE/IADC 29410, Society of Petroleum Engineers International (SPE), presented at the SPE/IADC Drilling Conference, Feb. 28-Mar. 2, 1995, 9 pages.
Sears, "Determination of Specific Surface Area of Colloidal Silica by Titration with Sodium Hydroxide," Analytical Chemistry 28:12, Dec. 1956, 3 pages.
Sepehrinia and Mohammadi, "Wettability alteration properties of fluorinated silica nanoparticles in liquid-loaded pores: An atomistic simulation," Applied Surface Science 371: 349-359, May 15, 2016, 11 pages.
Seright, "Washout of Cr (III)-Acetate-HPAM Gels from Fractures," SPE-80200, Society of Petroleum Engineers International (SPE), proceedings from the SPE International Symposium on Oilfield Chemistry, Feb. 5-7, 2003, 10 pages.
Shan et al., "Graphene oxide enhanced polyacrylamide-alginate aerogels catalysts," Carbohydrate Polymers 203, Jan. 1, 2019, 26 pages.
Shi et al., "Superhydrophobic silica aerogels reinforced with polyacrylonitrile fibers for adsorbing oil from water and oil mixtures," Royal Society of Chemistry (RSC), RSC Advances 7:7 (4039-4045), Jan. 1, 2017, 7 pages.
Song et al., "Plasma-induced grafting polyacrylamide on graphene oxide nanosheets for simultaneous removal of radionuclides," Royal Society of Chemistry (RSC), Physical Chemistry Chemical Physics 17: 398-406, Jan. 1, 2015, 24 pages.
Stengl et al., "h-BN—TiO 2 Nanocomposite for Photocatalytic Applications," Hindawi Publishing Corporation, Journal of Nanomaterials 2016: 4580516, Jan. 1, 2016, 12 pages.
Taha and Lee, "Nano Graphene Application Improving Drilling Fluids and performance," IPTC 18539-MS, International Petroleum Technology Conference (IPTC), presented at the International Petroleum Technology Conference, Dec. 6-9, 2015, 16 pages.
Tinsley and Williams, "A New Method for Providing Increased Fracture Conductivity and Improving Stimulation Results," SPE-4676-PA, Society of Petroleum Engineers (SPE), Journal of Petroleum Technology, Nov. 1975, 7 pages.
Tongwa et al., "Evaluation of a Nanocomposite Hydrogel for Water Shut-Off in Enhanced Oil Recovery Applications: Design, Synthesis and Characterization," Material Views, Journal of Applied Polymer Science, Jul. 17, 2012, 8 pages.
Van Poollen et al., "Hydraulic Fracturing—Fracture Flow Capacity vs. Well Productivity," SPE 890-G, Society of Petroleum Engineers International (SPE), TP8012, Halliburton Oil Well Cementing Co., presented at 32nd Annual Fall Meeting of Society of Petroleum Engineers Oct. 6-9, 1957, Petroleum Transactions, AIME 213, 1958, 5 pages.
Van Poollen, "Productivity vs Permeability Damage in Hydraulically Produced Fracture," Halliburton Oil Well Cementing Co., presented at meeting of Southwestern District Division of Production, Mar. 1957, 8 pages.
Veil et al., "A White Paper Describing Produced Water from Production of Crude Oil, Natural Gas and Coal Bed Methane," Technical Report prepared for the National Energy Technology Laboratory (US DOE, under Contract No. W-31-109-Eng-38), Jan. 2004, 87 pages.
Villamizar et al., "Interfacially Active SWNT/Silica Nanohybrid Used In Enhanced Oil Recovery," SPE 129901, Society of Petroleum Engineers International (SPE), presented at the 2010 SPE Improved Oil Recoveiy Symposium, Apr. 26-28, 2010, 11 pages.
Vincent, "Examining Our Assumptions—Have Oversimplifications Jeopardized Our Ability to Design Optimal Fracture Treatments?" SPE 119143, Society of Petroleum Engineers (SPE), presented at the 2009 SPE Hydraulic Fracturing Technology Conference, Jan. 19-21, 2009, 51 pages.
Vincent, "Five Things You Didn't Want to Know About Hydraulic Fractures," Chapter 4, presented at the International Conference for Effective and Sustainable Hydraulic Fracturing, May 2013, 14 pages.
Wagle et al., "Using Nanoparticles to Formulate Sag-Resistant Invert Emulsion Drilling Fluids," SPE/IADC-173004-MS, IADC, Society of Petroleum Engineers International (SPE), presented at the SPE/IADC Drilling Conference and Exhibition, Mar. 17-19, 2015, 12 pages.
Walker et al., "Proppants, We Still Don't Need No Proppants—A Perspective of Several Operators," SPE 49106, Society of Petroleum Engineers (SPE), presented at the 1998 SPE Annual Technical Conference and Exhibition, Sep. 27-30, 1998, 8 pages.

(56) References Cited

OTHER PUBLICATIONS

Wang et al., "Ultralow Electrical Percolation in Graphene Aerogel/Epoxy Composites," American Chemical Society Publications (ACS), Chemistry of Materials (CM) 28:18 (6731-6741), Sep. 7, 2016, 11 pages.

Williams et al., "Acidizing Fundamentals," Society of Petroleum Engineers of AIME, Jan. 1979, 131 pages.

Wu et al., "Poly(2-acrylamide-2-methylpropanesulfonic acid)-modified Si0 2 Nanoparticles for Water-based Muds," Industrial & Engineering Chemistry Research (I&EC), American Chemical Society Publications (ACS), Industrial and Engineering Chemistry Research 56:1 (168-174), Dec. 20, 2016, 7 pages.

Zhang et al., "Engineering the Unique 2D Mat of Graphene to Achieve Graphene-TiO 2 Nanocomposite for Photocatalytic Selective Transformation: What Advantage does Graphene Have over Its Forebear Carbon Nanotube?" American Chemical Society Publications (ACS), ACS-NANO 5:9 (7426-7435), Sep. 27, 2011, 10 pages.

Zhang et al., "TiO 2-Graphene Nanocomposites for Gas-Phase Photocatalyptic Degradation of Volatile Aromatic Pollutant: Is TiO 2-Graphene Turley Different from Other TiO 2-Carbon Composite Materials?" American Chemical Society Publications (ACS), ACS-NANO 4:12 (7303-7314), Dec. 28, 2010, 12 pages.

Zhou et al., "Preparation of a reduced graphene oxide/zirconia nanocomposite and its application as a novel lubricant oil additive," Royal Society of Chemistry (RSC), RSC Advances 5:111 (91802-91812), Jan. 1, 2015, 11 pages.

Zielinska, "Swelling of EPDM rubbers for oil-well applications as influenced by medium composition and temperature," Elastomery, TOM 20:2, Jan. 2016, 12 pages.

Zolfaghari et al., "Preparation and Characterization of Nanocomposite Hydrogels Based on polyacrylamide for Enhanced Oil Recovery Applications," Journal of Applied Polymer Science 100: 2096-2103, Feb. 17, 2006, 8 pages.

Zuo et al., "Polymer/Carbon-Based Hybrid Aerogels: Preparation, Properties and Applications," MDPI, Materials 8:10 (6806-6848), Oct. 9, 2015, 43 pages.

PCT International Search Report and Written Opinion in International Appln. No. PCT/US2020/049323, dated Dec. 11, 2020, 14 pages.

\* cited by examiner

PROPPING OPEN HYDRAULIC FRACTURES

CROSS-REFERENCE TO RELATED APPLICATIONS

This application claims the benefit of U.S. Application Ser. No. 62/896,255 filed on Sep. 5, 2019, the entire contents of which are incorporated by reference in its entirety.

TECHNICAL FIELD

The disclosure relates to hydraulic fracturing.

BACKGROUND

Hydraulic fracturing (also referred to as fracking, hydrofracturing, or hydrofracking, for example) is a well stimulation technique that involves pumping fluid into a wellbore to form fractures in a formation. Hydraulic fracturing can increase the flow of one or more fluids in a well. Propping agents can be flowed into the formed fractures to keep apart the fracture surfaces (that is, prop open the fractures), so that fluid can continue to flow through the fractures once the pumping operation of the hydraulic fracturing process ceases.

SUMMARY

This disclosure describes technologies relating to hydraulic fracturing, and more specifically, propping open fractures formed by hydraulic fracturing.

In a first general aspect, a composition includes an emulsion of nanocomposite in water and a proppant. The nanocomposite includes an epoxy resin and an organically modified montmorillonite compatible to the epoxy resin.

In a second general aspect, an organically modified montmorillonite including a hydrophobic surface is obtained. The organically modified montmorillonite is mixed with an epoxy resin to form an epoxy nanocomposite. The epoxy nanocomposite is mixed with water to form a water-external epoxy nanocomposite emulsion.

In a third general aspect, a proppant is introduced with a carrier fluid into a well. The carrier fluid includes an emulsion of nanocomposite in water. The nanocomposite includes an epoxy resin and an organically modified montmorillonite compatible to the epoxy resin. The proppant and the carrier fluid is maintained within the well for a time period sufficient for the emulsion to destabilize, thereby allowing the nanocomposite to coat the proppant.

Implementations of the first, second, and third general aspects may include one or more of the following features.

The organically modified montmorillonite can include a hydrophobic surface.

A ratio of nanocomposite to water in the emulsion can be about 1:1.

The organically modified montmorillonite can be formed by reacting montmorillonite with a quaternary ammonium salt.

The epoxy nanocomposite can include about 1 weight percent (wt. %) to about 10 wt. % of the organically modified montmorillonite.

The quaternary ammonium salt can be selected from the group consisting of dimethyl benzyl (hydrogenated-tallow) ammonium chloride, dimethyl bis(hydrogenated-tallow) ammonium chloride, methyl bis(hydrogenated-tallow) ammonium sulfate, and bis(2-hydroxy-ethyl) methyl tallow ammonium chloride.

The water-external epoxy nanocomposite emulsion can be mixed with proppant.

The carrier fluid can be prepared, for example, by implementation of the second general aspect.

Introducing proppant into the well with the carrier fluid can include pumping, through the well, pulses of (a) the carrier fluid carrying the proppant alternately with (b) a compatible fracture fluid, wherein the carrier fluid carrying the proppant and the compatible fracture fluid are pumped at a fracture pressure.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1:
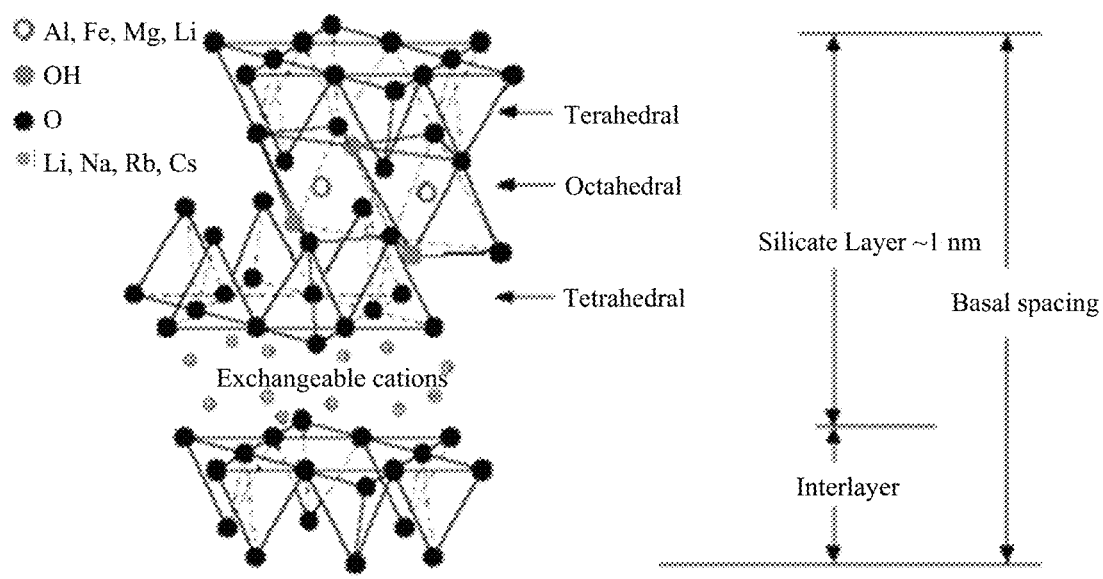
FIG. 1 is a diagram illustrating the structure of a nanocomposite material that can be a part of a treatment fluid for a well.

Propping agents, typically referred to as "proppants," are solid materials—often sand, treated sand, or man-made materials such as ceramics—that are designed to keep an induced hydraulic fracture open during or following a fracturing treatment. A proppant can be added to a fracking fluid, which varies in composition depending on the type of fracturing. Typically, proppants are gel-based, foam-based, or slickwater-based (for example, water containing one or more chemical additives). Also, fluids more concentrated with proppants are more viscous compared to fluids that carry less proppants. Characteristics such as pH and various rheological factors also can affect the concentration of proppant that a fracturing fluid can carry. Other than proppants, slickwater fracturing fluids typically are mostly water (for example, 99% or more by volume), but gel-based fluids can contain polymers, surfactants, or both at as much as 7 volume percent (vol. %), disregarding other additives.

A proppant pillar fracture geometry, also referred to as "channel fracturing," can be used in place of a standard porous proppant pack. A pillar fracturing approach can provide greater fracture conductivity than a conventionally propped fracture. This disclosure describes a composition (and methods for preparing and using the composition) that can be used to treat a well. For example, the composition described can be used for hydraulic fracturing of a subterranean zone. The composition includes an emulsion of nanocomposite in water. The nanocomposite includes an epoxy resin and an organically modified montmorillonite compatible to the epoxy resin. The organically modified montmorillonite includes a hydrophobic surface. In some implementations, the composition also includes a proppant. The subject matter described in this disclosure can be implemented in particular implementations, so as to realize one or more of the following advantages. The composition described can be used to carry proppant to a subterranean zone with reduced risk of settling during treatment time and closure time in comparison to conventional fracturing fluids.

The composition carrying the proppant can be introduced to the subterranean zone in a pulsing manner to create proppant pillar areas that can help to keep fractures open. This creation of proppant pillar areas by the composition is in contrast to conventional fracturing fluids which, after breaking, typically create open channels with near infinite conductivity. The composition described includes nanocomposite material that can enhance the mechanical strength of the proppant (and in turn, the proppant pillars) and prevent crushing of the proppant due to, for example, overburden stress. The composition including a water-external emulsion (that is, an emulsion with water as the external phase) of nanocomposite material including epoxy resin can be used to form proppant pillars in fractures formed in subterranean zones. The composition described can reduce the risk of proppant flowback and can also reduce the risk of unwanted sludge formation that can lead to formation damage.

In some implementations, a well (for example, the well 100 described later with reference to FIG. 4) can undergo a treatment process, for example, hydraulic fracturing. A composition 150 (shown later in FIG. 4) can be introduced to the well 100 during the treatment process. The composition 150 includes an emulsion of nanocomposite in water. The nanocomposite includes an epoxy resin and an organically modified montmorillonite compatible to the epoxy resin.

In some implementations, a ratio of nanocomposite to water in the emulsion is about 1:1, about 9:1, or any ratio there between (for example, about 2:1, about 3:1, about 4:1, about 5:1, about 6:1, about 7:1, or about 8:1). Some examples of suitable epoxy resin include, without limitation, epoxy resins based on bisphenol A and epoxy resins based on reaction of epichlorohydrin with bisphenol F, phenol formaldehyde, aliphatic alcohols, polyols, or aromatic amines. The size of the epoxy resin used in the emulsion can be less than or equal to about 1,000 microns (for example, about 500 microns to about 1000 microns, about 250 microns to about 500 microns, about 100 microns to about 250 microns, or about 50 microns to about 100 microns). The epoxy resin in the emulsion can exhibit suspension characteristics that reduce the risk of early screen outs as the pumping regime transitions from a turbulent flow to lamellar flow while the fracture is being formed in subterranean formation.

The melting temperature of the epoxy resin can be greater than or equal to about 60 degrees Celsius (° C.) (for example, about 60° C. to about 65° C., about 65° C. to about 70° C., about 70° C. to about 75° C., about 75° C. to about 80° C., about 80° C. to about 90° C., about 90° C. to about 100° C., about 100° C. to about 150° C., or about 150° C. to about 200° C.). As the bottom hole temperature increases to a temperature greater than about 60° C., the epoxy resin can begin to melt, coating the proppant and providing sufficient tackiness to make the proppant grains stick together. This feature can help reduce the risk of potential screen outs after the pillar fracturing operation. In some implementations, the fluid containing the emulsified epoxy resin can be liquid at room/surface temperature, but can cure to become a hard plug after a period of time (for example, about 30 minutes to four hours, within about one hour, within about two hours, or within about three hours) at a suitable temperature (for example, about 60° C. to about 200° C., or about 100° C. to about 150° C.).

Epoxy resin is hydrophobic, while non-modified montmorillonite is hydrophilic. To make the montmorillonite compatible with the epoxy resin, the montmorillonite is organically modified. The term "organically modified" means treated with a compound that is considered organic, that is, a compound that includes carbon. The montmorillonite can be organically modified such that the organically modified montmorillonite includes a hydrophobic surface, thereby making the organically modified montmorillonite compatible with the epoxy resin.

Organically modifying the montmorillonite can include reacting montmorillonite with a quaternary ammonium salt. The quaternary ammonium salt can be selected from a group consisting of dimethyl benzyl (hydrogenated-tallow) ammonium chloride, dimethyl bis(hydrogenated-tallow) ammonium chloride, methyl bis(hydrogenated-tallow) ammonium sulfate, and bis(2-hydroxy-ethyl) methyl tallow ammonium chloride. The reaction between the montmorillonite and the quaternary ammonium salt can result in an exchange of sodium ions and organic counter ions. Such ion-exchange not only increases the clay interlayer space but also changes the surface property of the montmorillonite from being hydrophilic to being hydrophobic. The crystalline structure of montmorillonite can include layers of two silica tetrahedral fused to an edge-shared octahedral sheet of either aluminum hydroxide or magnesium hydroxide. Stacking of these layers can lead to Van der Waals gaps between the layers, and these gaps can be referred to as interlayer space or gallery. The isomorphic substitution within the layers can generate negative charges that are counterbalanced by cations residing in the interlayer space.

The water portion of the emulsion can include one or more additives. For example, in some implementations, the water portion of the emulsion includes a polymer, a surfactant, an acid (such as hydrochloric acid), a friction reducer (such as polyacrylamide), guar gum, a biocide, an emulsion breaker, an emulsifying agent, 2-butoxyethanol, a tracer, a permeability enhancing agent, an accelerator, a retardant, or a combination of these.

Permeability enhancing agents typically dissolve with time, brine, hydrocarbon flow, pressure, or temperature, to leave a conductive void space within the proppant pillars. Some examples of suitable permeability enhancing agents include, without limitation, polylactic acid beads, fibers, fabrics, or any combination these; resins, salts, benzoic acid, acid salts, or wax beads; low vapor pressure liquids or gases, and methanol.

Accelerators and retardant can modulate the curing time of the epoxy resin. Accelerators can decrease the hardening time of the epoxy resin, while retardants can prolong the hardening time of the epoxy resin. Once the epoxy resin hardens in the subterranean formation, its compressive strength can be about 0.00001 pounds per square inch (psi) to about 200,000 psi (for example, about 0.00001 psi to about 0.00005 psi, about 0.00005 psi to about 0.0001 psi, about 0.0001 psi to about 0.001 psi, about 0.001 psi to about 0.01 psi, about 0.01 psi to about 0.1 psi, about 0.1 psi to about 1 psi, about 1 psi to about 10 psi, about 10 psi to about 100 psi, about 100 psi to about 1,000 psi, about 1,000 psi to about 10,000 psi, about 10,000 psi to about 100,000 psi, or about 100,000 psi to about 200,000 psi), and its permeability can be about 0.01 millidarcy (mD) to about 20,000 darcy (D) (for example, about 0.01 mD to about 0.1 mD, about 0.1 mD to about 1 mD, about 1 mD to about 10 mD, about 10 mD to about 100 mD, about 100 mD to about 1 D, about 1 D to about 10 D, about 10 D to about 100 D, about 100 D to about 1,000 D, about 1,000 D to about 10,000 D, or about 10,000 D to about 20,000 D). In some implementations, the permeability of the epoxy resin after it hardens can be zero.

The composition 150 can also include a proppant, for example, sand or ceramic. The proppant can be, for example, carried by the external water phase of the emulsion. When proppant is included in the composition 150, the proppant concentration in the composition 150 can be from about 0 to 12 pounds per gallon (lb/gal) (for example, about 0.1 lb/gal to about 1 lb/gal, about 0.5 lb/gal to about 2 lb/gal, about 1 lb/gal to about 3 lb/gal, about 2 lb/gal to about 4 lb/gal, about 3 lb/gal to about 5 lb/gal, about 5 lb/gal to about 8 lb/gal, about 8 lb/gal to about 10 lb/gal, or about 10 lb/gal to about 12 lb/gal). Typically, the compressive strength of the composition 150 is greater than an overburden pressure of the subterranean formation.

FIG. 1 is a diagram illustrating the structure of an example of the organically modified montmorillonite that can be included in the composition 150. The lattice structure of montmorillonite clays can include an octahedral alumina sheet between two tetrahedral silica sheets. A single crystal lattice of montmorillonite can be negatively charged due to the isomorphism substitution mainly in the octahedral layer. The negative charge of the lattice can be balanced by the exchangeable cations, which are in the clay interlayer space. The exchangeable cations (for example, sodium ions, calcium ions, or both) can be replaced by suitable organic or inorganic cations.

Figure 2:
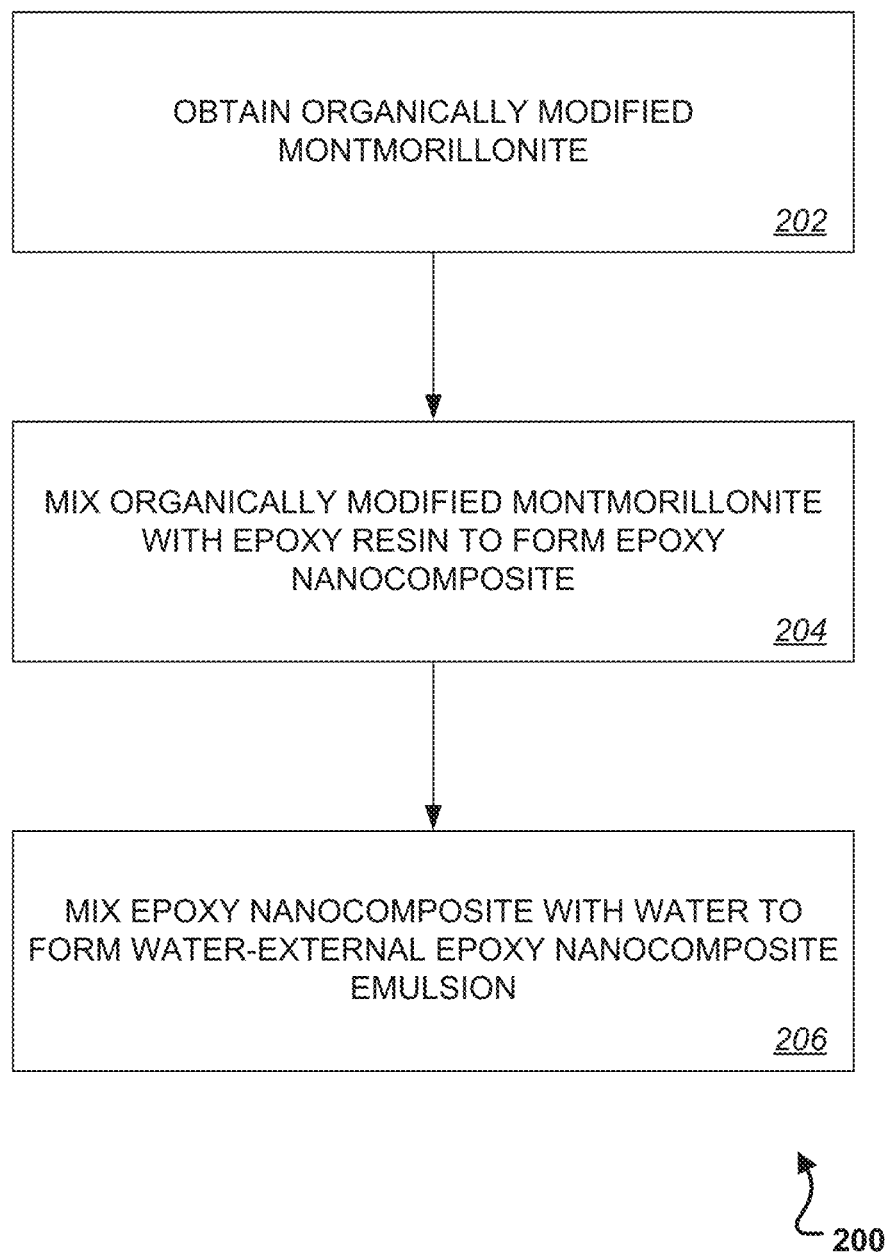
FIG. 2 is a flow chart of an example method for preparing a treatment fluid for a well.

FIG. 2 is a flow chart of an example method 300 for preparing the composition 150. At step 202, an organically modified montmorillonite including a hydrophobic surface is obtained. As mentioned previously, the hydrophobic surface makes the organically modified montmorillonite compatible with epoxy resin.

In some implementations, the organically modified montmorillonite is formed before step 202. For example, montmorillonite can be reacted with a quaternary ammonium salt to form the organically modified montmorillonite. As mentioned previously, the quaternary ammonium salt can be selected from a group consisting of dimethyl benzyl (hydrogenated-tallow) ammonium chloride, dimethyl bis(hydrogenated-tallow) ammonium chloride, methyl bis(hydrogenated-tallow) ammonium sulfate, and bis(2-hydroxyethyl) methyl tallow ammonium chloride.

This paragraph describes an example procedure for forming the organically modified montmorillonite. Sodium montmorillonite can be dispersed in water to form an aqueous dispersion. The aqueous dispersion can be stirred, for example, at room temperature for 24 hours. An aqueous solution of the quaternary ammonium salt can then be added to the aqueous dispersion to form an organoclay suspension. The organoclay suspension can be stirred, for example, for 12 hours. The organoclay suspension can then be filtered, for example, under vacuum to obtain an organoclay. After filtering, the organoclay can be dispersed in water and then stirred, for example, for 4 hours. This washing process of filtering, dispersing in water, and stirring can be repeated as desired. After the washing process, the organoclay can be filtered once more and then dried, for example, at a temperature of 60° C. under vacuum for 24 hours. The resulting material can then be ground into a powder. This powder is an implementation of the organically modified montmorillonite.

At step 204, the organically modified montmorillonite is mixed with an epoxy resin to form an epoxy nanocomposite. In some implementations, the organically modified montmorillonite makes up about 1 weight percent (wt. %) to about 10 wt. % of the epoxy nanocomposite. Mixing the organically modified montmorillonite with the epoxy resin at step 204 can cause the organically modified montmorillonite to uniformly disperse across the epoxy resin matrix. One or more epoxy resin chains can enter between layers of the organically modified montmorillonite, which can lead to delamination of the montmorillonite layers. This delamination of individual montmorillonite layers by the epoxy resin is possible because the organically modified montmorillonite includes a hydrophobic surface, thereby making the montmorillonite compatible with the epoxy resin.

At step 206, the epoxy nanocomposite is mixed with water to form a water-external epoxy nanocomposite emulsion (the composition 150). As mentioned previously, the water can include one or more additives. In some implementations, the water-external epoxy nanocomposite emulsion is mixed with proppant. In some implementations, the water already includes proppant before the epoxy nanocomposite is mixed with the water.

Figure 3:
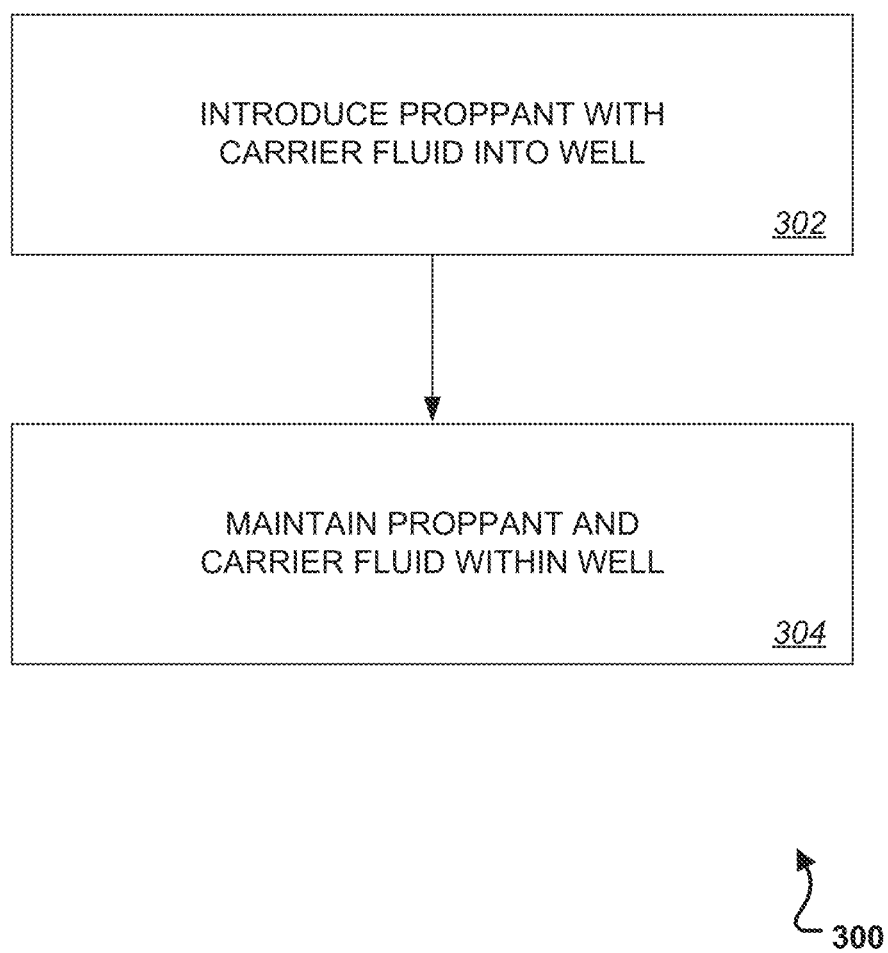
FIG. 3 is a flow chart of an example method for treating a well.

FIG. 3 is a flow chart of an example method 400 for well treatment. At step 302, proppant is introduced into a well (for example, the well 100) with a carrier fluid (for example, the composition 150). The carrier fluid includes an emulsion of nanocomposite in water. The nanocomposite includes an epoxy resin and an organically modified montmorillonite compatible to the epoxy resin. The carrier fluid can be prepared, for example, by implementing method 200.

The proppant and the carrier fluid can be pumped into the well 100 under conditions suitable to cause the epoxy resin to generate pillar structures within the well 100, for example, through melting and coating the proppant, through curing such that the epoxy resin itself becomes proppant, or both. In some implementations, the proppant and the carrier fluid can be pumped into the well 100 at a temperature of about 200 degrees Fahrenheit (° F.) to about 400° F. (for example, about 200° F. to about 250° F., about 250° F. to about 300° F., about 300° F. to about 350° F., or about 350° F. to about 400° F.).

In some implementations, the proppant and the carrier fluid are introduced into the well 100 at step 302 by pumping, through the well 100, pulses of the carrier fluid carrying the proppant alternately with a compatible fracture fluid. The carrier fluid carrying the proppant and the compatible fracture fluid can be pumped at a fracture pressure (that is, at a pressure sufficient to fracture the subterranean zone).

The pulses of fluid can be injected at a rate per cluster of 1 barrels per minute (bpm) to about 120 bpm (for example, about 5 bpm to about 25 bpm, about 5 bpm to about 50 bpm, about 20 bpm to about 60 bpm, about 25 bpm to about 50 bpm, about 50 bpm to about 75 bpm, about 75 bpm to about 100 bpm, or about 100 bpm to about 120 bpm). When fluids are alternately pulsed when pumped into the reservoir, the pulsing time between the fluids can be from about 2 seconds to about 10 minutes (for example, about 2 seconds to about 30 seconds, about 30 seconds to about 60 seconds, about 10 seconds to about 1 minute, about 30 seconds to about 2 minutes, about 1 minute to about 3 minutes, about 3 minutes to about 5 minutes, about 5 minutes to about 7 minutes, or about 7 minutes to about 10 minutes).

The compatible fracture fluid can include a conventional fracture fluid, such as a pad fluid. In some implementations, the compatible fracture fluid can include one or more of an acid stage, a slickwater, a linear gel, a crosslinked gel, a viscoelastic surfactant- (VES-) based gel, a foam gel, or a combination of these. The compatible fracture fluid can include proppant, for example, at a concentration of about 0 lb/gal to about 12 lb/gal (for example, about 0.1 lb/gal to about 1 lb/gal, about 0.5 lb/gal to about 2 lb/gal, about 1 lb/gal to about 3 lb/gal, about 2 lb/gal to about 4 lb/gal, about 3 lb/gal to about 5 lb/gal, about 5 lb/gal to about 8 lb/gal about 8 lb/gal to about 10 lb/gal, or about 10 lb/gal to about 12 lb/gal). In some implementations, the compatible fracture fluid has the same composition as the water phase of the carrier fluid without the nanocomposite.

In some implementations, a pad fluid is pumped into the well 100 before step 302, thereby generating a fracture geometry. Once the initial fracture geometry is generated, pulses of the carrier fluid carrying the proppant and the compatible fracture fluid can be pumped into the well 100 at step 302.

At step 304, the proppant and the carrier fluid is maintained within the well 100 for a time period sufficient for the emulsion to destabilize (that is, break), thereby allowing the nanocomposite to coat the proppant. For example, the well 100 can be shut in for the time period at step 304. In some implementations, the time period is in a range of from about 2 hours to about 6 hours.

In some implementations, after step 304, a final fluid stage can be pumped through the well 100, typically without pulsing. The final fluid stage can include the composition 150 or the compatible fracture fluid. For example, the final fluid stage can include the composition 150 carrying the proppant. As another example, the final fluid stage can include a conventional fracture fluid including the proppant.

In some implementations, a first fluid including the composition 150 without proppant (that is, the water-external epoxy nanocomposite emulsion without proppant) can be pulsed alternately with a second fluid including proppant. The second fluid can be substantially the same as the compatible fracture fluid.

Figure 4:
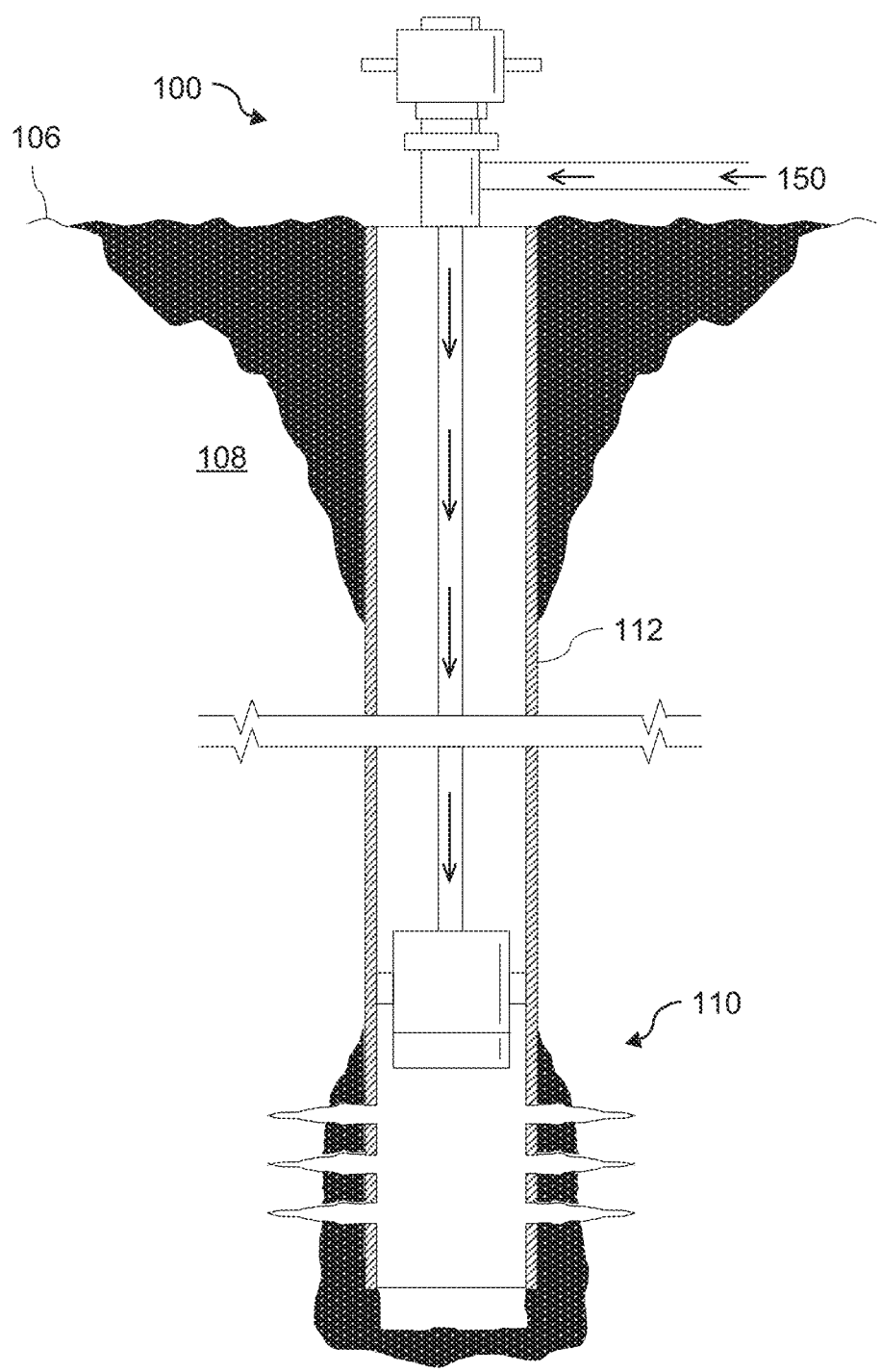
FIG. 4 is a schematic diagram of an example well that can be treated with a treatment fluid.

FIG. 4 depicts an example well 100. The well 100 extends from the surface 106 through the Earth 108 to one more subterranean zones of interest 110 (one shown). The well 100 enables access to the subterranean zones of interest 110 to allow recovery (that is, production) of fluids to the surface 106. In some implementations, the well 100 additionally or alternatively allows fluids to be placed in the Earth 108 (represented by flow arrows in FIG. 4). In some implementations, the subterranean zone 110 is a formation within the Earth 108 defining a reservoir. In other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other suitable types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well), or both.

In some implementations, the well 100 is a gas well that is used in producing natural gas from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing crude oil from the subterranean zones of interest 110 to the surface 106. While termed an "oil well," the well not need produce only crude oil, and may incidentally or in much smaller quantities, produce gas, water, or both. In some implementations, the production from the well 100 can be multiphase in any ratio. In some implementations, the production from the well 100 can be mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1, the casing 112 is perforated in the subterranean zone of interest 110 to allow fluid communication between the subterranean zone of interest 110 and the bore 116 of the casing 112. The casing 112 can be perforated, for example, during hydraulic fracturing operations. In some implementations, the casing 112 is omitted or ceases in the region of the subterranean zone of interest 110. This portion of the well 100 without casing is often referred to as "open hole."

The wellhead defines an attachment point for other equipment to be attached to the well 100. For example, FIG. 1 shows well 100 being produced with a Christmas tree attached the wellhead. The Christmas tree includes valves used to regulate flow into or out of the well 100.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" means a deviation or allowance of up to 10 percent (%) and any variation from a mentioned value is within the tolerance limits of any machinery used to manufacture the part. Likewise, "about" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A method, comprising:
   introducing, with a carrier fluid, proppant into a well, wherein the carrier fluid comprises an emulsion of nanocomposite in water, wherein the nanocomposite comprises:
      an epoxy resin; and
      an organically modified montmorillonite compatible to the epoxy resin; and
   maintaining the proppant and the carrier fluid within the well for a time period sufficient for the emulsion to destabilize, thereby allowing the nanocomposite to coat the proppant.

2. The method of claim 1, wherein the organically modified montmorillonite comprises a hydrophobic surface.

3. The method of claim 1, wherein a ratio of nanocomposite to water in the emulsion is about 1:1.

4. The method of claim 1, wherein the carrier fluid is prepared by:
   obtaining the organically modified montmorillonite comprising a hydrophobic surface;
   mixing the organically modified montmorillonite with the epoxy resin to form the nanocomposite; and
   mixing the nanocomposite with water to form the carrier fluid.

5. The method of claim 1, wherein introducing proppant into the well with the carrier fluid comprises pumping, through the well, pulses of (a) the carrier fluid carrying the proppant alternately with (b) a compatible fracture fluid, wherein the carrier fluid carrying the proppant and the compatible fracture fluid are pumped at a fracture pressure.

* * * * *